United States Patent Office 3,451,951
Patented June 24, 1969

3,451,951
PROCESS FOR THE PREPARATION OF MEMBRANE-SHAPED HIGH MOLECULAR ARTICLES
Yukio Mizutani, 1021 Oaza-Tokuyama; Wataru Tesima, 447 Oaza-Kusigahama; Sumio Akiyama, 3973 Oaza-Tokuyama; Reiichi Yamane, 6684 Oaza-Tokuyama; and Hirohumi Ihara, 6666 Oaza-Tokuyama, all of Tokuyama-shi, Yamaguchi-ken, Japan
No Drawing. Continuation-in-part of application Ser. No. 155,495, Nov. 28, 1961. This application Jan. 17, 1967, Ser. No. 609,775
Claims priority, application Japan, Apr. 15, 1961, 36/13,367
Int. Cl. C08j 1/34; C08f 47/14
U.S. Cl. 260—2.2                            8 Claims

ABSTRACT OF THE DISCLOSURE

A process for the preparation of a membrane-shaped high molecular article adapted for the introduction of an ion-exchange group in which a fine powder of thermoplastic high molecular substance having a particle size of less than $30\mu$ is admixed with a liquid monomer mixture comprised of a monomer having a functional group suitable for the introduction of an ion-exchange group, a cross-linking agent, and a polymerization initiator. The resulting paste is shaped in the form of a membrane and then heated at a temperature at which the thermoplastic substance is melted to form a homogeneous phase while at the same time the monomer in the mixture is polymerized.

---

The application is a continuation-in-part application of my earlier application Ser. No. 155,495 filed November 28, 1961 and now abandoned.

This invention relates to a process for the preparation of membrane-shaped high molecular articles adapted for the introduction of ion-exchange groups, and it also relates to a process for the production of ion-exchange membranes which comprises preparing the membrane-shaped high molecular article as a base membrane adapted for the introduction of the ion-exchange groups and then after treating the article so as to introduce the ion-exchange groups.

According to a feature of the invention a thermoplastic high molecular substance a large part of which is distributed in a particle diameter of less than $30\mu$ and which is swelled but is not dissolved in an organic liquid at a normal temperature (hereinafter referred to simply as a fine powder of thermoplastic high molecular substance) is mixed and homogeneously dispersed in a liquid monomer mixture which consists of a monomer having a functional group suitable for the introduction of an ion-exchange group, a cross-linking agent and a polymerization initiator to obtain an organosol-like paste. The term "organosol-like" as used in the specification refers to a state similar to organosol which is described in "Plastics Engineering Handbook," 3rd edition, page 223, published by the Society of the Plastics Industry, Inc. The obtained paste itself is shaped in the form of a thin sheet or membrane, or the paste is applied on a reinforcing material such as a cloth or net to form a reinforced membrane. Thereafter the membrane is heated at a temperature at which the fine powder of thermoplastic high molecular substance in the paste is fused to change the membrane-shaped paste into a homogeneous phase in the membrane form and simultaneously a polymerization reaction is effected to form a network high molecular polymer from a monomer having a functional group and a cross-linking agent. The membrane which is obtained by the above heating step does not yet have complete thermoplasticity. The membrane is suitable for the introduction of an ion-exchange group by an after-treatment and it has resistance against deformation and breakage of the membrane which can occur during the introduction of the ion-exchange group. Consequently, the base membrane according to the invention is suitable for the production of an ion-exchange membrane and it can be formed to have a large area.

According to a further feature of the invention a fine powder of thermoplastic high molecular substance is mixed with and dispersed in a liquid monomer mixture consisting of a monomer having a functional group suitable for the introduction of an ion-exchange group, a cross-linking agent and a polymerization initiator and if desired at least one other monomer which is copolymerizable with the above monomer, plasticizer and diluent, to obtain organosol-like paste. The paste itself is then shaped into the form of a membrane or the paste is applied onto a reinforcing material such as cloth or net, and thereafter the membrane is heated at a temperature at which the thermoplastic high molecular substance in the paste is fused to change the paste into a homogeneous phase in the form of the membrane while simultaneously a polymerization reaction is effected to form a network high molecular polymer from the monomer having a functional group, the copolymerizable monomer (in case of use) and the cross-linking agent. The membrane which is obtained by the above heating step does not yet have complete thermoplasticity. This membrane is suitable for the introduction of an ion-exchange group by an after-treatment and it has resistance to deformation and breakage during the treatment for the introduction of ion-exchange group. Thus, a base membrane having a large area and suitable for the introduction of an ion-exchange group can be obtained.

Another feature of the present invention is to obtain an ion-exchange membrane by applying a well known process for the introduction of an ion-exchange group (hereinafter referred to as an after-treatment) for the base membrane obtained by either of the above two processes.

In a process for producing an ion-exchange membrane having a large area by the introduction of an ion-exchange group with after-treatment, in general, the shape of the membrane can not be deformed and thus its destructive tendency can be inhibited when a linear high molecular substance which is not dependent on the introduction of an ion-exchange group is uniformly dispersed in the high molecular membrane shaped article, or when a linear high molecular substance is partially grafted with an ion-exchange group introducible polymer, or when a block polymer is formed by a reaction of a linear high molecular substance with an ion-exchange introducible polymer.

Such processes for obtaining membrane-shaped high molecular substance containing a linear high molecular substance, are known and are classified into the following four groups:

A first process is one wherein a linear high molecular substance is dissolved in a liquid monomer mixture and the solution is block-polymerized and thereafter the obtained block polymer is cut; (for example: refer to Japanese patent publication No. 2,793/58).

The second process is one wherein a linear high molecular substance is dissolved in a liquid monomer mixture and the solution is shaped in the form of a membrane or is applied onto a reinforcing material and thereafter is polymerized; (for example: refer to Japanese patent publication No. 24595/63).

The third process is one wherein a granular linear high molecular substance is permeated with a liquid monomer mixture and the mixture is polymerized and thereafter is shaped in the form of membrane by heating and melting; (for example, refer to British Patent No. 863,862).

The fourth process is one wherein a membrane-shaped linear high molecular substance is permeated with a liquid monomer mixture and then the permeated monomer is polymerized; (for example, U.S. Patent No. 3,133,889).

However, these processes respectively have many disadvantages, as will be described hereinafter.

In the first one:

(a) The quantity of linear high molecular substance which is soluble in liquid monomer mixture is limited. Namely, when the quantity of dissolved linear high molecular substance is increased, the viscosity and stringiness of the solution is increased and as a result the further operation becomes difficult. Therefore, in practice the limitation of the high molecular substance is at most about 30% and a high strength membrane is difficult to obtain.

(b) Since the removal of the heat of polymerization is difficult, the polymerization is not homogeneous. Namely, the regulation of temperature at the central portion becomes impossible in a large block and the control of the polymerization velocity is difficult. As a result, a non-homogeneous polymer is obtained and the strength of the membrane obtained is low.

(c) The viscosity is high and the removal of gas bubbles is difficult. As described above, namely, the solution which was dissolved with linear high molecular substance has a high viscosity and gas bubbles as such generated in the mixing step may be included in the polymer block and as a result the membrane will contain pinholes.

(d) The cutting and working of membrane is difficult.

In the second one:

(a) The quantity of linear high molecular substance which is soluble in liquid monomer mixture is limited. Namely, when the content of dissolved linear high molecular substance is increased, the viscosity and stringiness of the solution is increased, and as a result the production of the membrane becomes impossible. Particularly, in order to shape the solution in the form of a membrane by applying it onto a reinforcing material, a fluidity of the solution in a suitable range is necessary and therefore the quantity of linear high molecular substance is limited to a further narrow range.

(b) The viscosity of the solution is high and the removal of gas bubbles is difficult. Therefore, the obtained membrane has pinholes as described in the item (c) of the first process.

In the third one:

(a) In order to obtain a membrane by heating and melting, a cross-linking agent cannot be added to the liquid monomer mixture. Therefore, the produced ion-exchange membrane is not completely cross-linked. The physical properties and durability of the ion-exchange membrane which is obtained by after-treatment are poor.

(b) A step comprising two heating steps in the polymerization and membrane shaping is necessary.

(c) The quantity ratio of liquid monomer mixture to linear high molecular substance is limited to a narrow range. Namely, only liquid monomer mixture which is impregnated with granular high molecular substance can be used.

In the fourth one:

(a) The operation is complicated since it must include the steps of moulding, impregnating and polymerizing.

(b) The quantity ratio of liquid monomer mixture to linear high molecular substance is limited. Namely, the control of the quantity of liquid monomer mixture which is impregnated in the membrane-shaped high molecular substance is difficult and therefore the quantity is limited by the kind of membrane-shaped linear high molecular substance which is used.

As above mentioned, there are numerous disadvantages in these prior processes, and in particular, it was heretofore desired that the complications of the procedural operations and the strength of membrane be simultaneously improved.

The present invention seeks to satisfy these requirements and to provide a process for very simply producing a base membrane having a high strength and for producing an ion-exchange membrane having a high strength and superior electrical properties by the after-treatment of the base membrane.

One characteristic feature of the present invention is the composition of the liquid monomer mixture. Namely, the mixture is constituted of a monomer having a functional group suitable for the introduction of an ion-exchange group, a cross-linking agent and a polymerization initiator, with the optional addition of at least one other copolymerizable monomer, a plasticizer and a diluent. The quantity of monomer having functional groups suitable for the introduction of ion-exchange groups should be 0.3 to 3.0 times by weight of the fine powder of thermoplastic high molecular substance. When the quantity is less than 0.3 times by weight, the ion-exchange capacity of the obtained ion-exchange membrane is small, the electric resistance becomes high and the transport number becomes low. On the contrary, when the quantity is more than 3.0 times by weight, the obtained high molecular membrane shaped article is easily swelled and cracked and is broken by the after-treatment. As a result the mechanical property of the obtained ion-exchange membrane diminishes.

The quantity of cross-linking agent is preferably used in a range between 0.5 and 30% by weight of monomer component in the liquid monomer mixture. When the quantity is less than 0.5% by weight, the physical properties, particularly dimension stability and durability of the ion-exchange membrane which is obtained by the after-treatment of the obtained membrane-shaped high molecular substance are poor. When the quantity is more than 30% by weight, the electric resistance fo the obtained ion-exchange membrane becomes high and the physical properties of the ion-exchange membrane decreases.

A further characteristic of the present invention is the use of thermoplastic high molecular substance having a particle size of substantially less than $30\mu$, and preferably less than $2\mu$, said thermoplastic substance being swellable but not dissolvable in the liquid monomer mixture at normal temperature. These thermoplastic high molecular substances are those which are normally called "resin for paste" or "resin for dispersion" and each fine particle is preferably of substantially spherical form.

Another characteristic of the present invention is the forming of the organosol-like paste by mixing the fine powder of thermoplastic high molecular substance and the liquid monomer mixture. Since the fine powder of thermoplastic high molecular substance is homogeneously dispersed in the liquid monomer mixture, the viscosity of the mixture is low and the fluidity of the mixture is high even if a large quantity of thermoplastic high molecular substance is contained therein. Therefore, the quantity of liquid monomer mixture to fine powder of thermoplastic high molecular substance can be varied in a wide range while the fluidity can be maintained at a suitable degree for shaping it in the form of a membrane or for applying it onto a reinforcing material. As a result, the control of the quantity of ion-exchange group in the ion-exchange membrane which is obtained by the after-treatment can be easily carried out and the properties of the ion-exchange membrane can be regulated in a wide range. In order to obtain a paste having the above properties, the thermoplastic high molecular substance must have an average particle size less than 30μ, and preferably less than 2μ. When the diameter of fine powder is substantially more than 30μ a homogeneous suspension of liquid monomer mixture and thermoplastic high molecular substance is difficult to obtain and as a result the production of the membrane is difficult. In view of the desired fluidity of the paste, it is preferable that the shape of the particles in the fine powder be substantially of spherical form.

Furthermore, in order for the paste of the present invention to be satisfactorily shaped in the form of a membrane, the weight ratio of liquid monomer mixture to fine powder of thermoplastic substance should be maintained in the range of 0.3 to 20. When the quantity of liquid monomer mixture is small, paste having a fluidity cannot be obtained and the production of the membrane becomes impossible. Even if it can be spread out in the form of membrane, the liquid monomer mixture cannot be completely filled between the fine powders of thermoplastic high molecular substance. As a result spaces are formed and pinholes are contained in the paste film because gas bubbles are included when the paste in the form of the membrane is polymerized with heat. When the quantity of liquid monomer mixture exceeds the upper limit of the aforesaid ratio range, the production of membrane becomes difficult because the viscosity of paste is excessively decreased. It is necessary, therefore, that from an industrial point the weight ratio of liquid monomer mixture to fine powder of thermoplastic high molecular substance is in a range of 0.3 to 20.

Another further characteristic of the present invention is that the obtained paste can be easily spread to form a membrane therefrom or be applied onto a reinforcing material. Thereby a membrane can be obtained of high molecular material with one heating step. Thus, the fluid paste can be shaped in the form of membrane by being poured into a mould or by applying it onto a cloth or net reinforcing material.

When the paste is shaped in the form of a membrane, it is not necessary to employ a reinforcing material. However, the use of a reinforcing material is desirable in order to improve the dimensional stability of the resulting membrane-shaped high molecular article as the base membrane, and the dimensional stability of the ion-exchange membrane. In case a reinforcing material is used, the operation of shaping the paste in the form of a membrane is simple and only consists of coating the paste on the reinforcing material and this simple operation is very advantageous in practice. By the subsequent heating step, the fine powder of thermoplastic high molecular substance is fused together with the liquid monomer mixture to yield a homogeneous phase.

The fine powder of thermoplastic high molecular substance present in the paste is impregnated with the liquid monomer mixture, so that its thermoplasticity is enhanced. Thus, the thermoplastic high molecular substance which has been swollen with the liquid monomer mixture may be easily fused into a single phase in the form of a film by heating. This fusing of the thermoplastic substance into a film need not be carried out under compression. However, compression enhances the uniformity of the resulting film and transparency of the membrane-shaped high molecular article as the base membrane. The melting of the fine powder of thermoplastic high molecular substance and the polymerization of the monomer components are initiated simultaneously with heat. Therefore, a polymerization initiator which has an ability for initiating the polymerization with heat is previously added to the liquid monomer mixture. Generally, since all normally known polymerization initiators have an ability for initiating a polymerization at the temperature of the heating step according to the invention, it is not necessary that the kind of polymerization initiator be limited to any specific types.

When the polymerization reaction is completed the newly formed polymer has a cross-linking structure due to the cross-linking agent which is included in the monomer and the polymer is uniformly entwined with the thermoplastic high molecular substance which is converted from its fine powder state to a homogeneous body. Furthermore, part of the polymer becomes graft-polymerized by a chain transfer and the formed membrane is very strong and substantially cannot be melted by the application of heat. Therefore, a base membrane for a superior ion-exchange membrane can be obtained.

Another characteristic of the present invention is the introduction of the ion-exchange group by after-treating the base membrane obtained by the process of the present invention with a known method for the introduction of an ion-exchange group.

The after-treatment for the introduction of the ion-exchange groups may be carried out in a suitable way according to the kind of the functional group in the monomer unit. Thus, it depends on the functional groups suitable for the introduction of the ion-exchange groups which are present in the membrane shaped high molecular article as the base membrane. In this way, there may be produced ion-exchange membranes which are not only electro-chemically but also mechanically excellent.

The method for the introduction of the ion-exchange groups may be carried out in a suitable way, depending on the kind of functional groups suitable for the introduction of the ion-exchange groups which are present in the membrane-shaped high molecular article as the base membrane. For example, sulfonation, hydrolysis, chlorosulfonation followed by hydrolysis, chloromethylation followed by amination, formation of quaternary ammonium base and Mannich reaction, and the like, may be utilized therefor. According to the invention, the ion-exchange groups such as sulfonic acid group, carboxylic acid group, phosphonic acid group, quaternary pyridinum base group, quaternary ammonium base group, primary amino group, and tertiary amino group, etc., may be introduced into the membrane-shaped high molecular article. The ion-exchange group to be introduced into the membrane-shaped high molecular article is not subjected to any special restriction.

The substances which constitute the liquid monomer mixture is used in the present invention are exemplified as follows:

The monomer having the functional group suitable for the introduction of the ion-exchange groups according to the invention may be any of those which can impregnate the fine powder of thermoplastic high molecular substance used and contain the functional group suitable for introducing the ion-exchange groups. For instance, styrene, styrene sulfonic acid derivatives, acrylates, methacrylates, maleic anhydride, vinyl sulfonic acid derivatives, methyl vinyl ketone and vinyl pyridine derivatives, and the like, may be used. The copolymerizable monomers may be suitably selected, depending on the kind of said monomer having the functional group suitable to introduce the ion-exchange groups. For instance, styrene, methyl vinyl ketone, acrylonitrile, acrylates and methacrylates, etc., may be used as the copolymerizable monomer. As the monomeric cross-linking agent, divinyl benzene is a typical suitable substance.

In general, the polymerization catalyst includes free-radical type catalysts such as benzoyl peroxide, dicumyl peroxide, and $\alpha,\alpha'$-azo-bis-isobutyronitrile, etc. The method of adjusting the viscosity of the paste consists of admixing a suitable amount of a plasticizer or a solvent, either alone or together, which does not directly take a part in the formation of the resinous structure which is produced by the polymerization of the monomers. For instance, dioctyl phthalate, dibutyl phthalate and tricresylphosphate, etc., may be used as the plasticizer. The solvent may be selected depending on the monomers and the fine powder of thermoplastic high molecular substance employed together. When the fine powder of thermoplastic high molecular substance has been impregnated to an excessive extent, it is convenient to employ a solvent which will suppress the impregnation of said substance. On the contrary, when the impregnation is not sufficient, it is possible to use a solvent which will assist the impregnation of said substance. The process of the invention need not use any special solvent but can employ ordinary solvents such as gasoline, kerosine, dimethyl formamide, xylene, etc.

The fine powder of thermoplastic high molecular substance which is used in the present invention should be insoluble but impregnated with the liquid monomer mixture. The fine powder of thermoplastic high molecular substance may be used by mixing therewith not only one kind of polymer but also two or more kinds of fine powder of thermoplastic high molecular substances, such as for instance, polyethylene, polyvinyl chloride, acrylonitrile-vinyl chloride copolymer, vinyl chloride-vinylidene chloride copolymer, vinyl chloride-vinyl acetate copolymer.

When a reinforcing material is used, it is usual to employ an organic or inorganic reinforcing material which cannot be degraded in the treatment. For example, a glass fiber cloth may be used as the inorganic reinforcing material and "Vinylone" - (polyvinyl alcohol), "Kanekaron" (polyacrylonitrile), "Teviron" (polyvinylchloride), "Tetron" (polyethylene terephthalate), "Saran" (a copolymer of vinylchloride and vinylidene chloride), "Bonnel" (a copolymer comprising acrylonitrile as the main component), nylon, polyethylene and polypropylene, etc., may be used as the organic reinforcing material. The reinforcing material whether organic or inorganic, is generally used in a form of cloth or net.

An embodiment of the invention is now illustrated.

A liquid monomer mixture is prepared using suitable quantities of divinyl benzene, benzoyl peroxide and dioctyl phthalate as well as an amount of styrene as the monomer having the functional group suitable for the introduction of the ion-exchange groups. An amount of a fine powder of polyvinyl chloride is then admixed with the mixture to prepare a paste. In the preparation of the paste, the order of the addition of the components is optional and need not be limited to any special order. Then the paste coated onto a polyvinyl chloride cloth as a reinforcing material. A sheet of "cellophane" or a film of "Vinylon" is brought into a close contact with both the sides of the coated reinforcing material, which is then heated under compression so as to fuse the paste into a single phase and to polymerize the monomers. Alternatively, the paste may be coated onto a long continuous piece of the reinforcing material and a film of "Vinylon" is brought into a close contact with one or both sides of the coated reinforcing material which can be then wound up onto a roll under tension. In this case, the winding-up operation can produce a suitable pressure on the coated reinforcing material. The wound-up reinforcing material may be subsequently heated to effect fusion of the paste and polymerization of the monomers.

The heating temperature is suitably maintained at 70 to 80° C. during the period of the polymerization. It is preferred to raise the temperature once to about 110-120° C. during the polymerization period, although this is not always necessary. Once such a procedure is carried out, the fusion of the fine powder of thermoplastic high molecular substance into the film can be easily and completely achieved. It is also desirable to elevate the temperature at an early period of the polymerization. The membrane-shaped high molecular article obtained as the base membrane is translucent and has a high mechanical strength.

The method for the introduction of the ion-exchange group consists of utilizing the styrene units which are contained in the membrane-shaped high molecular article as the base membrane. When an anion-exchange membrane is to be produced, chloromethyl groups are firstly introduced by treating with a solution of chloromethylmethyl ether which is properly diluted with carbon tetrachloride containing a catalyst such as $SnCl_4$, $ZnCl_2$, $FeCl_3$, $AlCl_3$ and $BF_3$.

Subsequently the chloromethyl groups are reacted with an amine to give the desired anion-exchange groups. The types of the anion-exchange groups introduced vary depending on the kinds of amines used. Generally, trimethyl amine, triethanol amine and the lik emay be used. On the other hand, when a cation-exchange membrane is to be produced, the sulfonation is achieved. The sulfonating agent used includes concentrated sulfuric acid, sulfuric anhydride-dioxane complex and the like. In this way, ion-exchange membranes of excellent electro-chemical and mechanical properties can be produced according to the process of the invention.

In case styrene and divinyl benzene are used as the monomers, we have found that on carrying out the sulfonation of the base membrane with a concentrated sulfuric acid, it is necessary to raise the sulfonation temperature to about 57–70° C. since the velocity of the sulfonation is lower at room temperature. In this case, a cation-exchange membrane of excellent properties may be obtained but a coloration of the membrane occurs to a considerable extent. This coloration is probably due to unfavorable side-reactions other than the desired sulfonation. In order to overcome this difficulty, we have found that the coloration of the membrane can be decreased by copolymerizing the styrene with a vinyl monomer having an ester radical or a carboxylic acid anhydride group, such as acrylates, thereby increasing the sulfonation velocity to a higher extent at room temperature. This is very important in practice as it enables the sulfonation to be easily carried out at room temperature with concentrated sulfuric acid which is one of the least expensive sulfonating agents. Such vinyl monomer having the above-mentioned effects includes acrylates, methacrylates, maleic anhydride, vinyl sulfonic acid esters and the like.

To obtain an increase in the sulfonation velocity, dioctyl phthalate or the like even in considerable amounts can be added to the liquid monomer mixture. In this case, however, the concentrated sulfuric acid used can be largely lost and contaminated. Further, the resulting ion-exchange membrane can become porous and consequently show a decrease transport number. The process of the invention has an important significance in that the sulfonation velocity can be increased without any decrease in the transport number of the membrane.

The invention will be illustrated below with reference to the following examples.

Example 1

A liquid monomer mixture is prepared by mixing 100 parts of styrene, 10 parts of divinyl benzene, 1 part of benzoyl peroxide and 20 parts of dioctyl phthalate.

100 parts of a fine powder of polyvinyl chloride having a particle diameter of less than $2\mu$ and an average about $1\mu$ are admixed with the monomer mixture which is then coated onto a cloth of "Teviron" (polyvinyl chloride). Sheets of "Vinylon" (polyvinyl alcohol) are brought into close contact with both sides of the coated cloth which is subsequently heated at a temperature of 110° to 120° C. for 30 minutes under compression and then further heated at 70° C. for 10 hours, until the fusion of the fine powder of the polyvinyl chloride into the film and the polymerization of the monomers are completed. A flexible and translucent membrane-shaped high molecular article is obtained as a base membrane.

This base membrane is treated with a solution of chloromethyl methyl ether in the presence of a catalytic amount of stannic chloride to effect chloromethylation and then with an aqueous solution of 30% trimethyl amine to effect quaternization. In this way, an anion-exchange membrane is obtained. Alternatively, when the base membrane is treated with a concentrated sulfuric acid at 70° C. for 5 hours, a cation-exchange membrane is obtained.

The properties of these membranes are as follows:

|  | Effective resistance | Transport number |
|---|---|---|
| Anion-exchange membrane | 7Ω/cm.$^2$ | 0.90 |
| Cation-exchange membrane | 9Ω/cm.$^2$ | 0.88 |

In all the examples, the effective resistance is determined in 0.5 N aqueous solution of sodium chloride and the transport number is calculated according to Nernst's equation from the value of the membrane potential which is measured using 0.5 N and 2.5 N aqueous solutions of sodium chloride. Determination temperature is 25° C.

Example 2

A paste consisting of 10 parts of butyl vinyl-sulfonate, 10 parts of styrene, 3 parts of divinyl benzene, 0.1 part of benzoyl peroxide and 25 parts of a fine powder of vinyl acetate-vinyl chloride copolymer (5:95) having a particle diameter less than 25μ and an average of about 13μ is coated on a net of polyethylene (160 mesh) and the coated net is then heated at 80° C. for 18 hours during which the two sides of the net are covered with "Vinylon" films. The resulting membrane-shaped high molecular article as a base membrane is then subjected to hydrolysis by heating in aqueous hydrochloric acid. A cation-exchange membrane is thus obtained which has an effective resistance of 5Ω/cm.$^2$ and a transport number of 0.87.

Example 3

A paste consisting of 10 parts of styrene, 4 parts of methyl methacrylate, 2 parts of divinyl benzene, 0.1 part of benzoyl peroxide, 2 parts of dibutyl phthalate and 15 parts of a fine powder of polyvinyl chloride having a particle diameter less than 5μ and an average of about 3μ is coated onto a cloth of "Tevilon," which is then covered on both the sides with "Vinylon" films and subsequently heated at 80° C. for 10 hours to fuse the paste into a single phase and polymerize the monomers. If the coated cloth are subjected to compression during the polymerization of the monomers, there is obtained a highly transparent membrane-shaped high molecular article as a base membrane. This base membrane can be readily sulfonated by immersing it into concentrated sulfuric acid at room temperature for 20 hours. The ion-exchange membrane obtained has an effective resistance of 8Ω/cm.$^2$ and a transport number of 0.86. A base membrane obtained with a paste of the same composition as above-mentioned except that the methyl methacrylate is replaced by styrene, cannot be sufficiently sulfonated in 30 hours under the same conditions, so that the ion-exchanging properties of the resulting membrane are satisfactory.

Example 4

A paste consisting of 50 parts of styrene, 50 parts of 2-methyl-5-vinyl-pyridine, 15 parts of divinyl benzene, 2 parts of benzoyl peroxide and 50 parts of a fine powder of polyvinyl chloride having a particle diameter of less than 25μ and an average of about 13μ coated onto a long continuous cloth of "Tetron." The coated cloth is then closely covered on one side with a film of "Vinylon" and wound up on a cylinder of 10 cm. in diameter with a high tension being applied to the "Tetron" cloth. The wound-up cloth is then heated at 110° C. for 30 minutes and then at 80° C. for 8 hours to fuse the paste into a single phase and complete the polymerization of the monomer. When the base membrane thus prepared is treated with a gasoline solution of methyl iodide, an anion-exchange membrane is obtained which has an effective resistance of 5Ω/cm.$^2$ and a transport number of 0.91.

Example 5

The same procedure as in Example 4 was repeated using a cloth of "Tevilon" as the reinforcing material but the polymerization is carried out at 70° C. for 10 hours.

Example 6

A paste consisting of 10 parts of methyl acrylate, 1 part of divinyl benzene, 0.05 parts of benzoyl peroxide, 1 part of dimethyl formamide and 10 parts of a fine powder of a vinyl chloride-acrylonitrile copolymer (9:1) having a particle diameter less than 30μ and an average of about 15μ is coated onto a cloth of glass fiber, which is then converted into the membrane-shaped high molecular article as the base membrane by the treatment in accordance with the procedure as in Example 2. The base membrane is subjected to hydrolysis by heating it in a solution of hydrochloric acid in methanol (1:2). A weakly acidic cation-exchange membrane is obtained which has an effective resistance of 8Ω/cm.$^2$ and a transport number of 0.83.

Example 7

This example is intended to show the effect of the particle diameter of the thermoplastic substance on the resultant membrane obtained.

A mixture (A) was obtained by mixing a fine powder of polyethylene (the particle size of which is given the attached table) with a liquid monomer mixture comprising styrene, divinylbenzene, dioctyl phthalate and benzoyl peroxide. The mixture was painted on a polyethylene gauze (thickness: 0.7 mm.) and the painted gauze was heated at a temperature of 120° C. for one hour and then at a temperature of 80° C. for four hours under pressure using polyvinyl alcohol film as a covering material. The fine powder of polyethylene was fused and at the same time the monomer was polymerized. The high molecular membrane-shaped article (B) thus obtained was sulfonated by dipping it into 98% sulfuric acid solution at a temperature of 60° C. for 16 hours to obtain cation exchange membrane (C). The results obtained are shown in the following table.

TABLE.—PROPERTIES OF MIXTURE (A), HIGH MOLECULAR MEMBRANE-SHAPED ARTICLE (B) AND CATION-EXCHANGE MEMBRANE (C)

| Particle diameter of the polyethylene powder | St+DVB/ fine powder | Homogeneity of (A) | Physical properties of (B) | Properties of (C) | |
|---|---|---|---|---|---|
| | | | | Electric resistance | Transport number |
| 5 to 30μ | 0.5 | 0 | 0 | 17 | 0.84 |
| Substantially less than 25μ, average about 13μ | 1.0 | 0 | 0 | 10 | 0.85 |
| | 2.0 | 0 | 0 | 9 | 0.85 |
| 10 to 40μ | 0.5 | X | X | | |
| Substantially less than 35μ, average about 30μ | 1.0 | X | X | | |
| | 2.0 | 0 | 0 | 13 | 0.86 |
| 200 to 450μ | 0.5 | X | X | | |
| Substantially less than 400μ, average about 200μ | 1.0 | X | X | | |
| | 2.0 | X | X | | |

In the table, symbol "St" represents styrene, "DVB" represents divinyl benzene, "0" represents an acceptable state and "X" represents a poor or non-acceptable state. The quantity of dioctyl phthalate which was used as a plasticizer is in the ratio of dioctyl phthalate/fine powder of polyethylene=0.2, the quantity of polymerization initiator is benzoyl peroxide/St+DVB=0.01 and the purity of divinyl benzene, a cross-linking agent is 53% and the quantity thereof is DVB/St+DVB=0.03.

It is clear from this example that the fine powder becomes industrially unsuitable as the particle size of the used fine powder is increased beyond 30μ.

What is claimed is:

1. An ion-exchange membrane produced by a process comprising (a) admixing a fine powder of at least one thermoplastic high molecular substance selected from the group consisting of polyvinylchloride, polyethylene, vinyl chloride/vinyl acetate copolymer, vinyl chloride/acrylonitrile copolymer, and vinyl chloride/vinylidene chloride copolymer, said fine powder having a particle size of less than 30μ with a liquid monomer mixture comprising a monomer having a functional group suitable for the introduction of an ion-exchange group, divinylbenzene as a cross-linking agent, and a polymerization initiator to form a paste, said paste containing said monomer mixture in an amount of between 0.3 and 20 times by weight of said powder and the cross-linking agent in an amount of between 0.5 and 30% by weight of said monomer in the mixture, and said monomer in the monomer mixture being present therein in an amount such that the weight ratio of monomer to powder is between 0.3 and 3.0; (b) shaping the thus formed paste in the form of a membrane, (c) heating the membrane-shaped paste at a temperature at which the fine powder of thermoplastic high molecular substance is melted to form a homogeneous phase while at the same time the monomer in said mixture is polymerized; and (d) introducing an ion-exchange group into a functional group suited for the introduction of an ion-exchange group and which is present in the polymerized, membrane-shaped material.

2. An ion-exchange membrane as claimed in claim 1, wherein said monomer mixture further comprises at least one additional copolymerizable monomer.

3. An ion-exchange membrane as claimed in claim 1, wherein said monomer mixture further comprises at least one member selected from the group consisting of plasticizers and solvents.

4. An ion-exchange membrane as claimed in claim 1, wherein said paste is applied onto a reinforcing material to form said ion-exchange membrane.

5. An ion-exchange membrane as claimed in claim 1, wherein the process further comprises applying pressure to the membrane-shaped paste as it is heated.

6. An ion-exchange membrane as claimed in claim 1, wherein the particle size of the thermoplastic substance is less than 2μ.

7. An ion-exchange membrane as claimed in claim 1, wherein the monomer suitable for the introduction of the ion-exchange group is at least one member selected from the group consisting of styrene, vinylpyridine, acrylates, methacrylates, vinyl sulfonic acid esters, styrene sulfonic acid esters, maleic anhydride and methyl vinyl ketone.

8. An ion-exchange membrane as claimed in claim 1, wherein said monomer is styrene, said mixture further comprising a copolymerizable vinyl monomer having an ester radical or a carboxylic acid anhydride group, the obtained article being subjected to the introduction of a cation exchange group to form a cation exchange membrane.

References Cited

UNITED STATES PATENTS

| | | | |
|---|---|---|---|
| 3,157,713 | 11/1964 | Leese | 260—884 |
| 3,252,935 | 5/1966 | Thompson et al. | 260—40 |
| 2,678,306 | 5/1954 | Ferris | 260—2.2 |
| 2,898,311 | 8/1959 | Tsunoda et al. | 260—2.2 |
| 2,965,697 | 12/1960 | Duddy | 136—146 |
| 3,133,889 | 5/1964 | Hazenberg | 260—2.1 |
| 3,304,272 | 2/1967 | Zenftman | 260—2.1 |

FOREIGN PATENTS 3,919,542  9/1964  Japan.

WILLIAM H. SHORT, *Primary Examiner.*

M. GOLDSTEIN, *Assistant Examiner.*

U.S. Cl. X.R.

260—875, 878, 884, 881, 882, 885, 886